United States Patent Office

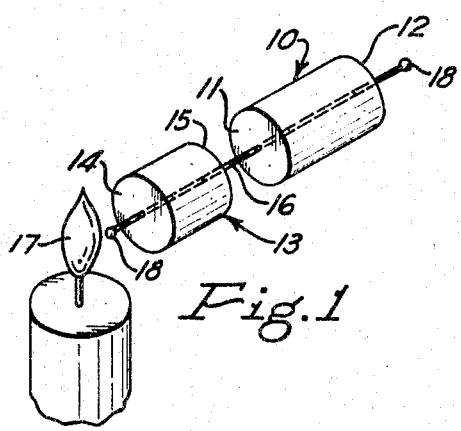
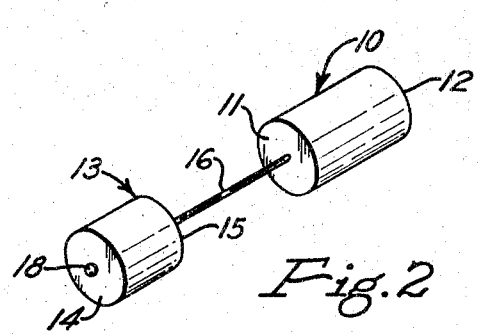
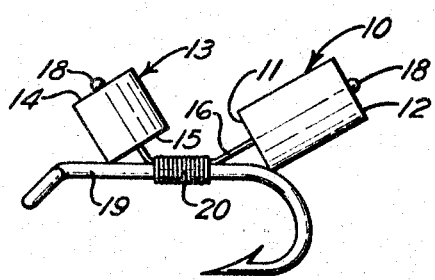
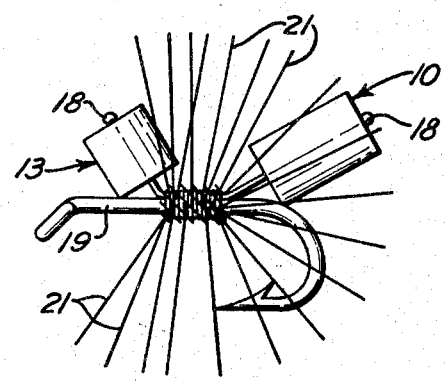
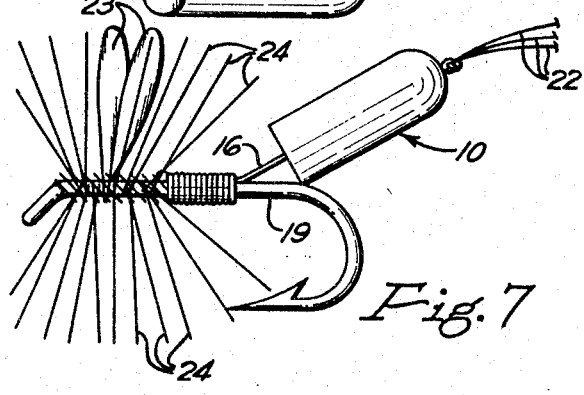

3,323,248
Patented June 6, 1967

3,323,248
FLOATING INSECT FISH BAIT
Edmund M. Sutryn, 126 Marion Drive,
Canonsburg, Pa. 15317
Filed Mar. 1, 1965, Ser. No. 436,170
5 Claims. (Cl. 43—42.37)

ABSTRACT OF THE DISCLOSURE

This specification discloses a floating insect fish lure which includes a cylindrical body of buoyant material which simulates the abdomen of an insect. The forward end of this abdomen-like body has a flat face at right angle to the body, and a piece of resilient monofilament passes through the body longitudinally. The monofilament is tied to the shank of a fishhook in such a manner as to hold the abdomen at an angle tilted away from the shank of the fishhook.

This basic body construction may be decorated to produce a fishing bait simulating any desired insect.

---

This invention relates to a bait useful in the sport known as "dry fly fishing."

The main object of the invention is to provide an artificial floating insect which is simple and inexpensive and which has inherent buoyancy so that it will float on water without relying on surface tension.

It is also an object of the invention to provide a basic system of components that may be made in varying sizes and shapes to simulate different insects that are eaten as food by the fish.

These and other objects and advantages of the invention will become apparent as the description proceeds.

In the drawings:

FIG. 1 is an isometric view illustrating a preliminary step in the production of the bait.

FIG. 2 is a view similar to FIG. 1 but showing a further step.

FIG. 3 is a side elevation illustrating the step of attaching formed bait portions to the hook.

FIG. 4 is a view similar to FIG. 3 but showing the addition of a few strands of "hackle" to complete the representation of an ant.

FIG. 5 is an isometric view of an insect body illustrating a preliminary step in attaching fiber material to represent the tail of an insect.

FIG. 6 is a view similar to FIG. 5 but showing the tail in place.

FIG. 7 is a side elevation of a completed bait attached to a hook.

Trout fishing with the dry fly is based on the fact that may-flies, stone flies, caddis flies, and various and sundry terrestial insects occur in the trout's environment in sufficient quantities to form a significant portion of its diet.

Throughout the years imitations and impressions of these insects have been developed using bird plumage, silk, fur, and other natural materials. The use of these lures has furnished great pleasure to countless fishermen. Furthermore, the creation of these lures has evolved into a quasi-art form and has thus provided a portion of the trout fishing fraternity with additional pleasure and satisfaction.

Despite the high degree of development and effectiveness of modern trout flies, they contain one inherent and at times exasperating disadvantage; due to having an average specific gravity greater than water, they must rely on surface tension to float. This in turn necessitates the maintenance of a water-repellant coating on the fly.

To be effective a dry fly must float on the surface of the water like its true-life counterpart. Also, it must be of the same size and general conformation as the insect being imitated.

From the previously stated facts, it is evident that a need exists for some method or device which will make possible a trout fly with built-in buoyancy, a capability of being reproduced in any size and shape, and, in order to satisfy those who prefer to tie their own, one which can be reproduced using existing techniques and utilizing standard and traditional materials.

Numerous attempts have been made to solve the problem but as yet no method or combination of methods has been applied that will fulfill all of the following requirements:

Natural buoyancy
Adaptability to Hook Sizes #22 to #4
Durability
Life-like conformtaion
Capable of being reproduced by standard and existing technique
Adherence to standard, traditional materials
Elimination of interference with hook by bulkiness of fly body
Simplicity
Low cost The present invention meets all of these requirements in a manner that will now be explained.

The anatomy of all insects consists of three main parts, the head, the thorax, and the abdomen. The present invention provides simplified forms that simulate these parts and which are sufficiently like-like for bait purposes.

In the drawings, FIGS. 1 to 4, illustrate a preferred form, which simulates an ant.

In these figures, 10 represents the abdomen, which is a cylindrical piece of material having flat faces 11 and 12 at its opposite ends. The faces 11 and 12 are preferably disposed at right angles to the longitudinal axis of the abdomen 10.

The part 13, which represents the head, is a small cylindrical piece of material having flat faces 14 and 15 disposed at right angles to the longitudinal axis of the head 13.

The parts 10 and 13 may be formed from a material such as cork, balsa wood, or plastic foam, which have inherent buoyancy and which will therefore float on water without relying on surface tension.

In order to form a simplified representation of the insect, the head 13 and the abdomen 10 are connected together by a resilient filament 16. This filament is preferably formed from a single strand of synthetic material such as nylon, or other polyamides which can be softened with heat, and which is waterproof and resilient. This type of filament is known in the fishing trade as "monofilament" to distinguish from braided fish line. The monofialment used in carrying out this invention may vary in diameter from 0.010" to 0.015" depending on the size of the insect.

In forming the parts 10 and 13, a hole is formed through them on their longitudinal axis. This hole is of a diameter to receive snugly the piece of monofilament 16.

The piece of monofilament is of such length that when the parts are assembled to the preliminary position of FIG. 2, the head 13 and abdomen 10 will be spaced apart a considerable distance. In many instances this space will be equal to the length of the abdomen.

After the head 13 and the abdomen 10 have been threaded on the filament to the positions shown in FIG. 1, each end of filament 16 is held adjacent to a source of heat, such as the candle flame 17. This heat melts the end of the monofilament and causes it to form a bead 18 which keeps the adjacent part from slipping off the filament.

After the beads 18 have been formed, the head and abdomen are moved apart until they abut against the beads 18. The simplified assembly of FIG. 2 is now ready for mounting on the fishhook.

In tying the assembly to the hook, the middle portion of the monofilament 16 is first brought into contact with the shank of the fishhook 19, and a number of turns 20 of silk thread are wound around the shank and the monofilament 16, as illustrated in FIG. 3. When the parts are secured in this manner, the resilient nature of the monofilament 16 causes the head 13 and the abdomen 10 to maintain positions jutting away from the fishhook as illustrated, and are therefore held clear of the point and barb of the fishhook 19. The winding 20 forms a simplified representation of the thorax of the ant.

A few turns of "hackle" 21 are tied in to represent legs, to complete a representation of an ant as illustrated in FIG. 4. With some modification this style may be made into a wasp.

FIGS. 5, 6, and 7 illustrate a variation that can be used to produce a simulation of a may fly.

In this case the body 10 is used without the head, and the rear end of filament 16 is tied into a simple knot which holds some strands of fiber material 22 to represent the tail. After the tail has been drawn up to the body, the front end of the filament 16 is wrapped to the shank of the fishhook in the manner previously described. As shown in this form, the rear end of the body may be given a rounded shape.

Some conventional wing material, indicated at 23, may be tied in with sufficient turns of hackle 24 to complete the simulated may fly.

Stone flies and caddis flies are produced in a similar manner, but the tail is omitted and the position of the wings may be altered to conform to the style of the particular insect being imitated.

It should be understood that variations may be made in certain parts of the construction. For example, the head and abdomen may be varied in configuration to represent different insects, but without departing from the general principles of the invention.

Also, to retain the head and abdomen in place, instead of integral beads formed on the ends of the monofilament, a simple knot may be tied at each end of the monofilament, as at the tail end in FIGS. 5 to 7.

The parts may, of course, be colored with stain or paint, or otherwise decorated as desired.

Since it is desired in all cases to produce a fish bait that will float on water as a result of its own inherent buoyancy, it is necessary to form the parts made of buoyant material large enough to carry the weight of the fishhook.

A particular advantage of the invention is that by stringing the head and the abdomen on the resilient monofilament, the monofilament reinforces the abdomen against breakage.

It may be desirable to market some of the subassemblies separately in order to provide the fisherman with basic units from which he can tie his own insects. For example, it may be desirable to sell only an abdomen mounted on a monofilament to be used in tying the may fly illustrated in FIG. 7. Likewise it may be desirable to sell as a unit the subassembly of head and abdomen mounted on a monofilament as illustrated in FIG. 2.

It will be understood by those skilled in tying flies that this invention provides a basic system of components that can be used in combination with standard materials and techniques to produce substantially all the different species of insects that are eaten by fish.

I claim:
1. A floating insect fish lure which comprises:
   a standard fishhook, having a shank and a hook portion;
   an elongated abdomen formed of buoyant material, having a piece of resilient monofilament passing therethrough on its longitudinal axis, the abdomen having a flat inner end formed at a right angle to the longitudinal axis of the abdomen, the monofilament being formed with enlargements at its opposite ends, and the forward end of the filament extending for a considerable distance beyond the inner end of the abdomen;
   the forward portion of the monofilament being tied to the shank of the fishhook; and
   the forward corner of the abdomen engaging the shank of the hook to hold the abdomen at an angle tilted away from the shank.
2. A device as claimed in claim 1 in which the elongated abdomen is generally cylindrical in form.
3. A device as claimed in claim 1 in which the forward end of the filament carries a piece of material representing the head of an insect.
4. A device as claimed in claim 1 in which the rear end of the elongated abdomen is formed with a flat face at right angles to the longitudinal axis of the abdomen.
5. A device as claimed in claim 1 in which the rear end of the elongated abdomen is rounded.

References Cited

UNITED STATES PATENTS

| | | | |
|---|---|---|---|
| 279,206 | 6/1883 | Van Altena | 43—43.15 X |
| 1,518,199 | 12/1924 | Hennings | 43—42.37 |
| 2,112,180 | 3/1938 | Stoddard | 43—42.37 |
| 2,423,431 | 7/1947 | Allen | 43—42.25 |
| 2,594,264 | 4/1952 | Riner | 43—42.53 X |

FOREIGN PATENTS 709,269   5/1954   Great Britain.

SAMUEL KOREN, *Primary Examiner.*

D. J. LEACH, *Assistant Examiner.*